June 7, 1960 A. S. PARKER ET AL 2,939,893
PROCESS FOR THE PYROLYSIS OF HYDROCARBONACEOUS MATERIAL
Filed Feb. 4, 1958 2 Sheets-Sheet 1

Inventors
Almon S. Parker
Maxwell Patrick Sweeney
By their attorneys
Howson and Howson.

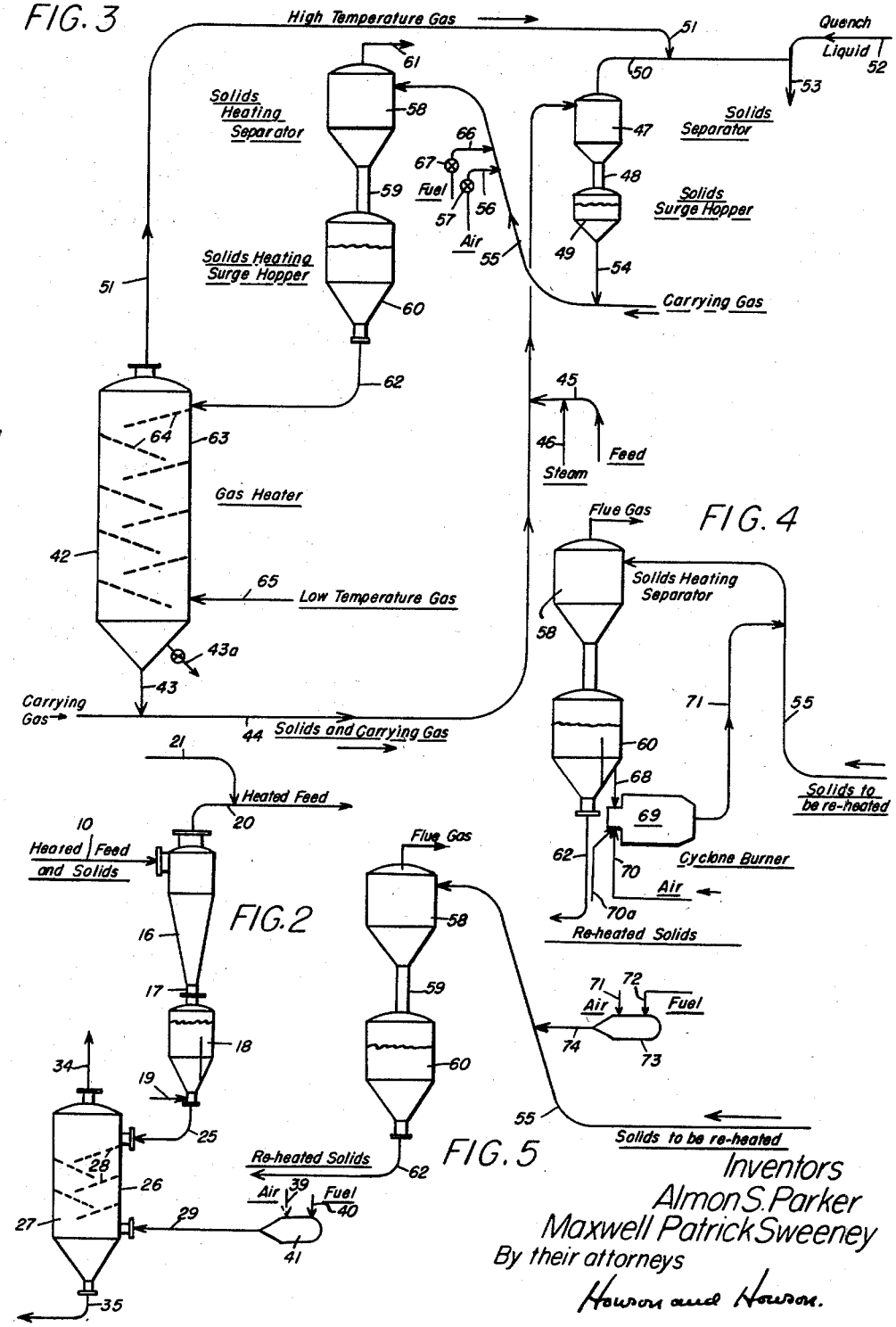

United States Patent Office 2,939,893
Patented June 7, 1960

2,939,893
PROCESS FOR THE PYROLYSIS OF HYDROCARBONACEOUS MATERIAL

Almon S. Parker, Bridgeport, and Maxwell Patrick Sweeney, Philadelphia, Pa., assignors to United Engineers & Constructors Inc., Philadelphia, Pa., a corporation of Delaware Filed Feb. 4, 1958, Ser. No. 713,216

14 Claims. (Cl. 260—679)

This application relates to a process for the pyrolysis of solid and liquid hydrocarbonaceous materials and particularly to a process of that general class in which the heat necessary for pyrolysis is conveyed to the material being pyrolyzed by a more efficient means than has been available hitherto.

The pyrolysis of low value solid and liquid hydrocarbonaceous materials to form more valuable materials has been practiced for many years. Recently, much use has been made of finely divided solids as the medium by which the heat necessary for pyrolysis is delivered to the material being pyrolyzed. In some instances contact between the hydrocarbonaceous material and hot solids has been in a fluidized bed of such solids. In other cases the heat transfer has been accomplished by bringing the hot solids and the hydrocarbonaceous materials into contact with one another as components of a moving fluid stream.

While these techniques have been satisfactory for many situations, when such materials as butadiene and acetylene are to be made, the minimum contact time which can be obtained either in a dispersed solids moving stream or in a fluidized bed is excessively great, and heat sensitive materials, such as butadiene and acetylene, are destroyed.

In accordance with the copending application of one of us (Parker, Serial No. 688,180, filed October 4, 1957) these difficulties are overcome by means of a process in which a solid or liquid hydrocarbonaceous material is mixed with a hot moving stream of gases and entrained solids in a first heating stage and thereby heated and at least partially volatilized. Some pyrolysis also preferably takes place in this stage. The solids are then separated from the gaseous components of the stream and the latter are mixed with a hot gas in a second heating stage to effect pyrolysis or further pyrolysis. The separated solids are reheated and used to contact fresh feed.

By using a hot gas to furnish the high temperature heat necessary for the second stage of the pyrolysis, it is possible to make the reaction time of this stage arbitrarily short and hence to avoid decomposition of the desired heat sensitive products.

In certain of the systems disclosed in the above copending application, the hot gas used in the second heating stage of the process is a flue gas taken directly or indirectly from a combustion chamber. In another system the hot gas is generated by bringing cold gas into contact with hot sand in a system which is entirely separated from the pyrolysis system itself. While in many instances these arrangements are entirely satisfactory, in some applications they have certain drawbacks. If flue gas is used directly as the hot gas in the second heating stage, the problem of separation of this gas from the products of pyrolysis is introduced. The use of a second disperse phase solids system, on the other hand, is expensive in regard to both initial costs, and operation and maintenance.

In accordance with the present invention these drawbacks are overcome by reheating the solids separated from the gases at the end of the first heating stage and using these reheated solids to generate the hot gas used in the second high temperature heating stage. The present invention thus comprises a process for the pyrolysis of hydrocarbonaceous material which includes mixing said material with a first hot stream of gases and entrained solids in a first heating stage to form a combined stream and heat said material, separating solids from the combined stream, mixing the material remaining in the combined stream after separation of solids therefrom with a second hot gas stream in a second heating stage to crack said remaining material, reheating said separated solids and heat exchanging the reheated solids with a cool gas stream to heat said cool gas stream and thereby form said second stream of hot gases.

In a preferred embodiment of the invention the separated solids are reheated by means of a third hot gas stream.

Preferably the heat exchange between the cool gas and reheated solids and between the solids and the third gas stream is carried out countercurrently.

In general the conditions and materials used in the actual pyrolysis steps of the present invention are those described in the copending application cited above. Thus, for example, the solid and liquid hydrocarbonaceous materials which may be employed in the present invention include, for example, coal, oil shale, lignite, peat, residual fuel oils such as Bunker C fuel oil, coke oven by-product tar, crude oil, reduced crude oil, virgin distillate gas oils, catalytic recycle gas oils, kerosenes, and naphthas. Similarly, the gases with which the hydrocarbonaceous material is mixed initially are preferably inert under the conditions of the reaction. Steam is a preferred inert gas. In certain instances, however, as when coal, lignite or peat are used as the hydrocarbonaceous feed, it may be desirable for the gas to contain elemental oxygen.

The solids which are entrained in the gas stream with which the hydrocarbonaceous feed is mixed initially may be any material which is substantially non-catalytic and which will remain inert during the pyrolysis reaction. Coke or char produced during the pyrolysis may be employed and this is preferred where it is desired and practical to recover a coke or char product from the system. Alternatively, such noncarbonaceous materials as sand or crushed alundum may be used.

The size of the solid particles depends to a certain extent on the volume and velocities of the entraining gas. The particle diameter will in general range between about 0.0008 and about 0.04 inch, preferably between about 0.002 and about 0.02 inch.

The high temperature gas used to crack the hydrocarbonaceous stream in the second stage is preferably superheated steam. However, other inert gases which may readily be separated from the products of pyrolysis may be used instead. It is also possible to use hydrocarbons, such as ethane or ethylene. The reactions occurring between the main feed and these added materials may in some instances be desirable.

The temperatures involved in the process will depend on the product it is desired to obtain and on the nature of the feed. The temperature of the gas-entrained-solids stream just prior to mixing the hydrocarbonaceous material will usually be between about 1000° F. and about 2000° F. When butadiene production is desired to be maximized, the lower part of this range, say from 1000° F. to 1500° F. would be used, and for acetylene the upper part, say 1500° F. to 2000° F.

After the initial mixing of the feed and the gas-entrained-solids stream, the temperature of the combined stream will be on the order of 900° F. to 1900° F., with the higher part of the range, say 1400° F. to 1900° F.

being applicable to acetylene production and the lower part, say 900° F. to 1400° F., to butadiene.

In general, the lower portion of the ranges given will be used where a heavy material, e.g. Bunker C fuel oil, is used and the higher portion where a lighter material is used.

The temperature of the high temperature gas used in the second stage will range between about 1400° F. and about 3000° F. To a certain extent, the temperature of the gas will depend on the amount being used, but usually when butadiene is to be produced the temperature will be not greater than about 2000° F., and when acetylene is to be made, not lower than 2200° F. After mixing with the products from the first stage, the temperature of the combined stream will normally be between about 1300° F. and about 2500° F. Again, the lower part of the range, say 1300° F. to 1800° F. will correspond to butadiene production and the upper part, say 1800° F. to 2500° F. to acetylene production.

The overall time of reaction will vary considerably with the products desired, the feed used and the operating temperature. In the initial stage normally the contact time will be between about 0.05 and about 10 seconds, preferably between about 0.2 and about 3 seconds.

This time is measured from the point of mixing the feed with the hot stream of gases and entrained solids to the point of adding the hot gases in the second stage.

In the second stage the reaction time is particularly important, if a careful control of the type of products obtained is desired. The precise contact time will depend on the temperature attained in the previous heating step and on the temperature of the hot inert gas, as well as on the product desired. Where butadiene is the product desired, the time will normally be between about 0.01 and about 2 seconds, preferably between about 0.1 and about 0.5 second. Where acetylene is the product desired, the time will normally be between about 0.01 and about 0.2 second.

The pressure employed in the system is not a critical factor although relatively low pressures, i.e. atmospheric or sub-atmospheric, are preferred. It will in general be between about 1 and about 50 p.s.i.a. preferably between about 2 and about 25 p.s.i.a.

In carrying out the process in accordance with the invention, the solids separated at the close of the first heating stage are allowed to accumulate in a hopper or other storage device and are then reheated. Their temperature, as they are collected, is normally on the order of 900° F. to 1900° F. In the reheating step their temperature is preferably raised to between about 1500° F. and about 3200° F. Preferably this heating is done by delivering the solid particles to a heat exchanger in which they may be contacted countercurrently by means of a hot fluid. Alternatively, however, the solids, after separation from the reactants at the end of the first heating step, may be entrained in a moving stream of hot gases and after their temperature has been raised sufficiently, separated from such gases.

In another embodiment the separated solids may be entrained in a carrying gas to which oxygen, or an oxygen containing gas is added. A part of the solids is burned and the resulting heat raises the temperature of the unburned portion.

In still another embodiment, the separated solids may be entrained in a carrying gas to which a fuel, such as natural gas or atomized oil, and oxygen or an oxygen containing gas is added. Combustion of the fuel in contact with the solids raises their temperature.

In all of these embodiments the solids, after they have been reheated, are brought into direct heat exchange relation, preferably countercurrently, with a cold gas, heating the gas up to between about 1400° F. and about 3000° F. At the same time, the solids are cooled to between about 1000° F. and about 2000° F. At this temperature they may then be added to the stream of carrying gas forming the first hot stream of gases and entrained solids to which the hydrocarbonaceous feed is added.

The invention will be further described with reference to the accompanying drawings. In the drawings:

Fig. 2 is a fragmentary flow diagram showing an alternate form of the process of Fig. 1 in which air and fuel are burned to produce the flue gas used to reheat the solids.

Fig. 3 is a flow diagram of another form of the invention in which solids are reheated in a disperse phase by means of fuel and air burned in contact with the solids.

Fig. 4 is a fragmentary flow diagram of a system similar to that shown in Fig. 3 in which solids are burned externally to produce flue gases which are then used to reheat solids in a disperse phase.

Fig. 5 is a fragmentary view of another form of the invention similar to that shown in Fig. 3 in which air and fuel are burned externally to produce flue gases which are then used to reheat solids in a disperse phase.

Figure 1:
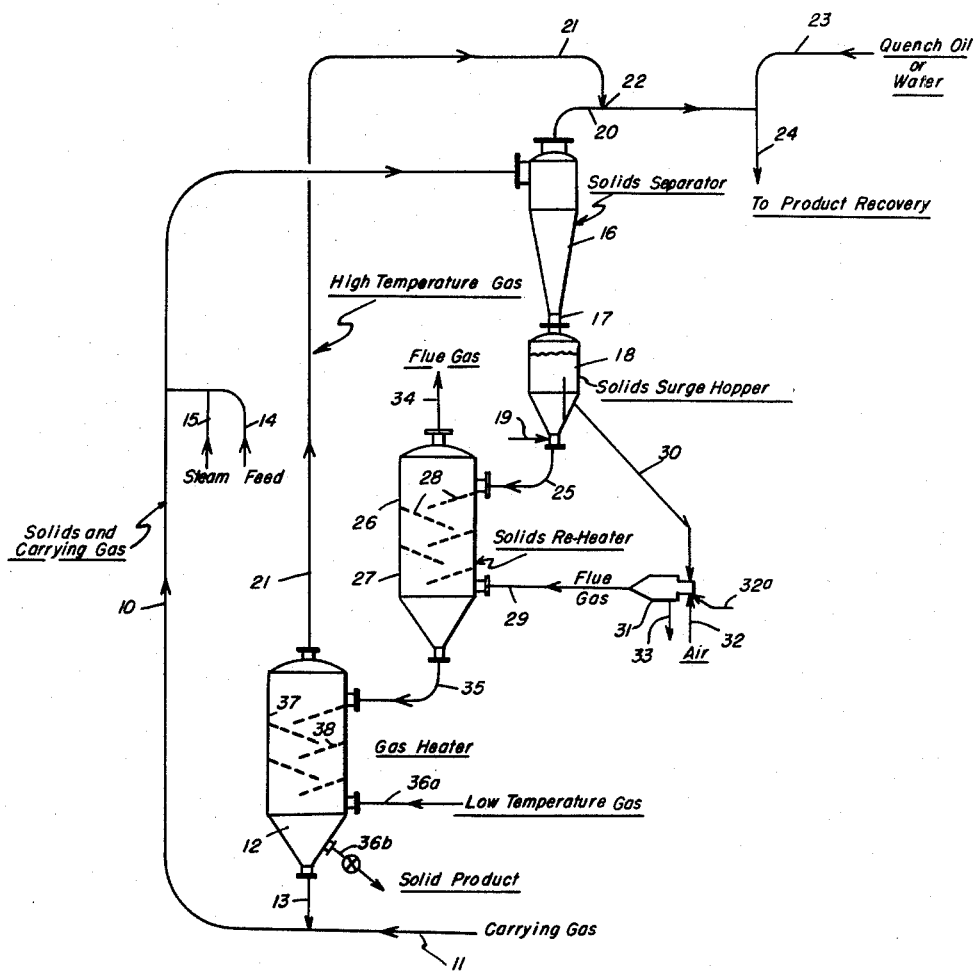
Fig. 1 is a schematic flow diagram of a preferred form of the invention in which a part of the separated solids are burned to produce a flue gas which is countercurrently heat exchanged with the remainder of the solids to reheat them, the solids then being used to produce the high temperature gas used in the second heating stage of the pyrolysis.

Referring to Fig. 1, an inert carrying gas such as steam is introduced into a reaction line 10 at 11. Hot solids at a temperature between about 1000° F. and about 2000° F. are drawn from a gas heater 12 via a line 13 and added to the gas flowing through the line 10. A hydrocarbonaceous feed is added to the hot stream of gases and entrained solids through a line 14. This feed may, if it is a liquid, be atomized by means of steam introduced through a line 15. The combined stream now consisting of hot solids, carrying gas, hydrocarbonaceous feed and, possibly, atomizing steam, flows through the line 10 to solids separator 16. As it flows, the hot solids heat the hydrocarbonaceous feed to a temperature of between about 900° F. and about 1900° F. and in so doing volatilize at least a portion of the non-vaporous components of the feed. Such volatilization may be simply a matter of vaporizing normally liquid components, or it may involve a certain amount of pyrolysis to produce gaseous or vaporizable products. Where the feed is coal or other solid material, some oxidation may also take place. In any case, however, the temperature and reaction time in the line 10 are adjusted so that the precursors of the unsaturated compounds which it is desired to obtain as a product are not themselves destroyed by an undue depth of cracking.

In the solids separator 16 the solids which were introduced from gas heater 12 together with any additional residue remaining unvolatilized are separated and fall through pipe 17 into a solids surge hopper 18. The condition of the solids in the surge hopper 18 is that of a loosely packed mass. If desired, aeration gas such as steam may be introduced into the hopper through a line 19 to maintain the solids in free-flowing condition.

The gaseous materials remaining after the solids have been removed in separator 16 including the volatile or volatilized components of the hydrocarbonaceous feed are taken overhead from separator 16 through line 20. A high temperature gas at 1400° F. to 3000° F. is then introduced into the line 20 from a line 21, the point of introduction being designated as 22. The amount of gas introduced from line 21 is so proportioned as to raise the temperature of the gaseous materials in line 20 to between about 1300° F. and about 2500° F. At this temperature, the hydrocarbonaceous material cracks to form unsaturated compounds such as butadiene, acetylene and the like. Before the cracking has had a chance to go further than the formation of the desired compounds, a quench medium, for example oil or water, is introduced through a line 23 to reduce the temperature of the cracked products to between about 150° F. and about 750° F. When maximum production of acetylenic compounds is sought and the temperature of the materials in the line 20 is high, the quench material is preferably water. When butadiene or other olefins are sought and the temeperature in line 20 is lower, oil may be used, if desired, as the quench material. After quenching, the products of pyrolysis are sent to further recovery equipment (not shown) through line 24.

In accordance with a preferred embodiment of the invention the solids gathered in the bottom of the solids surge hopper 18 are sent through a line 25 to a solids reheater 26 where they are heat exchanged countercurrently with very high temperature gases to raise their temperature to a point where they may be used to generate the high temperature gas used in line 21.

As shown in Fig. 1 the solids reheater 26 may be simply a cylindrical shell 27 containing a series of inclined baffles 28. The solids to be heated are taken from the hopper 18 through a line 25. They enter the heater 26 at the top, pass down and over the baffles 28 and are brought into direct contact with gas at a temperature of say 3000° F. to 3500° F., introduced into the bottom of the heater through a line 29.

In accordance with the preferred embodiment of the invention, the gas introduced through line 29 is generated by combustion of a portion of the solids drawn from the hopper 18. As shown in Fig. 1, a stream of solids is carried from hopper 18 through a line 30 to a cyclone burner 31. Air is delivered to the burner 31 through a line 32 and the solids are burned to give a flue gas in line 29 at a temperature of between about 3000° F. and about 3500° F. The ash produced in burner 32 is withdrawn as a liquid slag through a line 33. In those cases where the solids produced are not sufficient to provide the heat requirements of the process, additional fuel may be delivered to cyclone burner 31 through a line 32a.

It will be understood that in place of a cyclone burner any other convenient type of combustion device may be used. However, a slagging type combustion device such as a cyclone burner is preferred because often the coke produced in a pyrolysis of the type under consideration is refractory and difficult to burn at temperatures such as might be practical, for example, in a fluidized bed type burner. Moreover, by reducing the ash to a liquid slag it is possible to provide a means for continuously removing ash from the system. This prevents build-up of components such as vanadium which are likely to cause problem of heat control and corrosion.

After being heat-exchanged with the solids in reheater 26, the flue gases, now at a temperature of between about 1000° F. and about 2000° F. are removed through line 34 whence they may be used to make steam or exhausted through a stack, as desired.

The solids which have been reheated are removed from the bottom of reheater 26 through a line 35 and are sent to the gas heater 12. This heater may be constructed similarly to the reheater 26 comprising, for example, a cylindrical shell 37 having a series of inclined plates 38. The solids introduced through line 35 at a temperature between about 1500° F. and about 3200° F. cascade down over the plates 38 and are brought into direct contact with a low temperature gas (at a temperature of, say, between about 200° F. and about 1000° F.) introduced through a line 36a at the bottom of the heater. The solids serve to raise the temperature of the low temperature gas to between about 1400° F. and about 3000° F. The gas so heated is introduced into line 21 whence it may be added to line 20 to accomplish the second stage of the pyrolysis in the manner outlined above.

The solids, after giving up a portion of their heat to the gas, fall down into the bottom portion of the gas heater 12 whence they may be delivered to the reaction line 10 through line 13 as outlined above.

In certain cases it may not be possible or desirable to burn the solids which are removed from the gases in separator 16. This may be the case where it is desired to recover a maximum portion of the residue formed in line 10, or where no substantial quantity of residue is formed. It may also be the case where the solids are not themselves basically carbonaceous in nature so that it is not possible to use a slagging type combustion device to burn the residues which may have deposited on them. Where for any reason it is not desired to burn a portion of the solids, the hot gases added through line 29 may be created by burning some other type of fuel. This is shown schematically in the fragmentary flow diagram of Fig. 2. As shown in that figure, air is introduced through a line 39 and a fuel is introduced through a line 40 into a burner 41 where the fuel is burned to produce flue gases which are delivered through line 29 to the reheater 26. The fuel introduced into burner 41 through line 40 may be a gaseous material such as natural gas or it may be an oil such, for example, as Bunker C fuel oil.

Although it is preferred to reheat the solids in the manner indicated in Fig. 1 or 2, i.e. by counter-current heat exchange with hot gas, other techniques can be used. One such technique is shown in Fig. 3. Referring to Fig. 3, solids from a gas heater 42 are drawn off through a line 43 and are entrained in a carrying gas flowing through a reaction line 44. The carrying gas may be steam or any other inert gas as in the case of the embodiment of Fig. 1. The solids, as they are entrained in the gas flowing through line 44, are at a temperature between about 1000° F. and about 2000° F. A hydrocarbonaceous feed is introduced into the stream of carrying gas and entrained solids through a line 45. If desired, the feed may be atomized by means of steam or other inert gas introduced into the line 45 through line 46. The high temperature of the solids serves to raise the temperature of the hydrocarbonaceous feed to between about 900° F. and about 1900° F. and to at least partially vaporize it as in the case of Fig. 1. The combined stream flows through line 44 and empties into a solids separator 47. In the separator 47 solids are removed from the gases and flow downwardly through a pipe 48 into a solids surge hopper 49. The vapors separated from the solids in separator 47 pass overhead through a line 50 where they are met by a gas at a temperature of between about 1400° F. and about 3000° F. introduced into the line 50 through a line 51. By means of this high temperature gas the temperature of the vapors flowing through line 50 is raised to between about 1300° F. and about 2500° F. At this temperature the feed is cracked to form unsaturated compounds such as butadiene or acetylene, the compounds formed depending upon the temperature to which the feed is raised.

After a reaction time of between about 0.01 and about 2 seconds at this elevated temperature, the stream in line 50 is quenched by means of a quench liquor such as oil or water introduced through a line 52. The quench liquor reduces the temperature of the feed to between about 150° F. and about 750° F. at which temperature decomposition of the initial unsaturated products of pyrolysis is avoided. The combined stream of quench liquor, carrying gases and cracked hydrocarbonaceous material is removed through a line 53 whence it may be delivered to further recovery equipment not shown.

The solids removed from the gases in separator 47 and delivered into solids surge hopper 49 are drawn from the bottom of the hopper through a line 54. An inert carrying gas such as steam is introduced into a heating line 55 and the solids drawn from the hopper 48 through the line 54 are entrained in this carrying gas.

In accordance with one embodiment of the invention air is then added to the line 55 through a line 56 controlled by a valve 57. The air added to the line 55 causes combustion of a part of the solids flowing through the line to heat up the remainder. The combined stream of solids, carrying gas and hot gaseous products of combustion are delivered to a solids heating separator 58. The solids at a temperature of 1500° F. to 3200° F. are separated from the gases and pass through a pipe 59 to a solids heating surge hopper 60. The gases removed from the solids in separator 58 pass out through a line 61. They may be used to generate steam or may be wasted, depending upon the economics of the process.

As noted, the solids which collect in the hopper 60 are at a temperature of between about 1500° F. and about 3200° F. They are removed from the hopper through a line 62 and are delivered to the gas heater 42. This heater is similar in construction to those described above in connection with Fig. 1. It comprises a cylindrical shell 63 and a number of inclined baffles 64. The solids introduced into the heater are cascaded down over the baffles 64 and meet a gas such as steam having a temperature of between about 200° F. and about 1000° F. introduced into the bottom of the gas heater through line 65. As the low temperature gas contacts the hot solids its temperature is raised to between about 1400° F. and about 3000° F. It is removed from the heater through line 51 and is delivered to line 50 where it serves to complete the cracking of the hydrocarbonaceous material as indicated above.

In place of burning a portion of the solids in line 55, in order to obtain the necessary heat for reheating the solids and generating hot gas, an external fuel may be introduced into the line 55 through a line 66 and valve 67 and burned in the line 55. This fuel may be a gaseous material such as natural gas or it may be a liquid such as Bunker C fuel oil.

Again, in place of burning the solids in line 55, they may be burned externally to furnish gaseous products of combustion which are then added to the line to reheat the solids. This embodiment of the invention is shown in Fig. 4 which is a fragmentary view of a general system such as shown in Fig. 3.

In Fig. 4 solids are removed from the surge hopper 60 through a line 68 and are delivered to a slagging type burner such as a cyclone burner 69. Air is furnished to the burner 69 through a line 70 and the solids are burned to produce hot gaseous products of combustion at a temperature of say 3000° F. to 3500° F. If insufficient solids are produced to provide the process heat, additional fuel may be delivered to burner 69 through a line 70a. The products of combustion from burner 69 are added to the line 55 by means of a line 71 where they serve to heat the solids moving through line 55 to a temperature of between about 1500° F. and about 3200° F. The combined stream of solids, flue gases and carrying gas used in line 55 is delivered to the solids separator 58 where the solids are removed as described above in connection with Fig. 3.

In still another embodiment of the invention, a fuel other than the solids produced in the system is burned externally of the system to furnish hot products of combustion which are then added to the solids flowing through line 55 to heat the solids. This embodiment is shown in Fig. 5 which is a fragmentary view of a system generally similar to that of Fig. 3. Referring to Fig. 5, a fuel such as oil or gas is delivered through a line 72 and air through a line 71 to a burner 73. Combustion of the fuel takes place to produce hot gaseous products of combustion which are then delivered through a line 74 to the line 55 where they serve to heat the entrained solids in the manner indicated in connection with Figs. 3 and 4.

The invention will be further described with reference to the following specific examples. It is understood that these examples are given for the purpose of illustration only and are not to be taken as in any way restricting the invention beyond the scope of the appended claims.

*Example I*

In an apparatus of the type shown in Fig. 1, 83.3 barrels per hour of a Bunker C fuel oil [1] are charged through line 14 to a moving stream of steam and entrained coke particles moving through line 10. Atomizing steam is charged through line 15. The velocity of the gases and entrained solids moving through line 10 is about 50 feet per second and the rate of mass flow is about 191,000 lbs. per hour. The weight ratio of steam to coke is about 0.01:1. The temperature of the stream at the point of introduction of the feed through line 14 is about 1480° F. The combined stream is delivered to a solids separator 16 and the gaseous materials separated from the solids are then contacted with superheated steam delivered through line 21. The temperature of the preheated feed flowing through line 20 before introduction of the steam from line 21 is about 1200° F. The total time of contact from the point of introduction of the feed in line 14 to the introduction of the superheated steam through line 21 is 2 seconds. By introduction of steam through line 21 the feed is heated to a temperature of about 1500° F. and is then quenched by means of oil introduced through line 23. The total time of contact between the point of introduction of superheated steam through line 21 and quenching by oil through line 23 is 0.10 second. The gaseous product (water-free) removed through line 24 analyzes as follows on a water-free basis (mole percent):

| | |
|---|---:|
| Diolefins (mainly butadiene) | 9 |
| $C_2H_4$ | 20 |
| $C_3H_6$ | 13 |
| Other olefins | 8 |
| Saturated hydrocarbons (90% $CH_4$) | 38 |
| $H_2$ | 12 |
| | 100 |

The solids, 192,600 lbs. per hour, removed in separator 16 fall through the pipe 17 into a hopper 18. 3,600 lbs. per hour of these solids are removed through a line 30 and burned in the cyclone burner 31, along with 1,300 lbs. per hour of methane and about 65,200 lbs. per hour of air to give hot flue gases for heater 26. 189,000 lbs. per hour of solids are removed from the hopper 18 through line 25 and delivered to the upper part of the solids reheater 26. The flue gas removed from the top of heater 26 is at a temperature of about 1300° F. The solids removed through line 35 are at a temperature of about 1845° F. 42,400 lbs. per hour of saturated steam are introduced into the gas heater 12 through line 36a. Steam at a temperature of about 1800° F. is removed from the gas heater 12 through line 21. All of the coke produced in line 10, 3,600 lbs. per hour, is burned in the cyclone burner 31.

*Example II*

The procedure of Example I is carried out except that the system of Fig. 2 is used to generate hot gases for use in solids heater 26. Using a conventional oil burner, such as 41,530 gallons per hour of Bunker C fuel oil are burned to furnish the necessary heat. The products are substantially the same as described in Example I, except that 3,600 lbs. per hour of product coke is withdrawn through line 36b.

*Example III*

Using the system shown in Fig. 3, 83.3 barrels per hour of the Bunker C fuel oil used in Example I are introduced through line 45. Crushed alundum entrained in steam is

---

[1] API gravity _____ 9

Ultimate analysis (weight percent):
| | |
|---|---:|
| H | 10.0 |
| C | 87.0 |
| S and inerts | 3.0 |
| | 100.0 |

Conradson carbon (weight percent) _____ 15 used as the heat transfer medium in line 44. At the point of introduction of the feed the temperature of the stream in line 44 is about 1980° F. After separation of the solids in separator 47 the temperature of the gas stream is about 1700° F. Superheated steam at 2500° F. is added to the line 50, through line 51.

The total time of contact in the first stage is about 2 seconds. The total time in the second stage is about 0.05 second.

469,400 lbs. per hour of solids are drawn from the hopper 49 and entrained in 5,000 lbs./hour steam flowing through line 55. 301,000 lbs./hour of air and 13,700 lbs./hour of Bunker C fuel oil are added to line 55 through lines 56 and 66, respectively. Combustion of the injected oil and the coke deposited on the alundum particles heats the solids separated in separator 58 to 2570° F. At substantially this temperature solids are withdrawn from hopper 60 and delivered to gas heater 42. 78,200 lbs./hour of steam at 400° F. are charged to heater 42 through line 65 where it is heated to about 2500° F. The hot steam is then charged to line 50 as indicated above. Solids at 2000° F. are withdrawn from heater 42 through line 43 and entrained in line 44 as described.

The gaseous product (water-free) obtained at 53 has the following analysis (mole percent):

| | |
|---|---|
| $C_2H_2$ | 20 |
| $C_2H_4$ | 10 |
| Olefins higher than $C_2H_4$, and aromatics | 1.4 |
| $C_3$ and $C_4$ acetylenes | 1.0 |
| Saturated hydrocarbons 99.5% $CH_4$ | 17.1 |
| $H_2$ | 43 |
| CO and $CO_2$ | 7.5 |
| | 100.0 |

*Example IV*

The procedure of Example III is repeated except that the solids in line 55 are heated by hot products of combustion originating outside the line 55, according to the arrangement shown in Fig. 5. Sufficient excess air is introduced through line 71 to burn coke deposited on circulated alundum. Products identical with those of Example III are obtained.

*Example V*

Using the apparatus of Fig. 3, modified in the manner shown in Fig. 4, 50,000 lbs./hour of a bituminous coal is charged through line 45. The coal has a proximate analysis as follows (percent by weight):

| | |
|---|---|
| Carbon | 54.1 |
| VCM | 34.4 |
| Ash | 8.2 |
| Moisture | 3.3 |
| | 100.0 |

The stream flowing through line 44 comprises char entrained in steam and is at a temperature of about 1700° F. After introduction of the coal and removal of solids in separator 58 the temperature of the remaining gaseous material is about 1200° F. 17,600 lbs./hour of steam at 1800° F. is introduced through line 51. The total time of contact (feed introduction to quench) is 2.3 seconds and the time in the second stage is 0.3 second.

7,050 lbs./hour of char are sent from hopper 60 to the burner 69 where they are burned to give 88,600 lbs./hour of hot flue gas. This gas is added to the line 55 where it serves to heat the char removed from hopper 48 to about 1930° F.

The remainder of the char collected in hopper 60, i.e. that portion not burned in burner 69, amounting to about 137,700 lbs./hour is sent to gas heater 63. Here it is contacted with 17,600 lbs./hour of steam at 400° F., and serves to heat the steam to the 1800° F. required for delivery to line 30. 29,700 lbs./hour of char are removed as product through line 43a. The remainder is used in line 44 as indicated.

The gaseous product (water-free) removed through line 53 analyzes as follows (mole percent):

| | |
|---|---|
| $H_2$ | 23 |
| $CH_4$ | 48 |
| Other paraffins | 1.9 |
| Olefins | 9.2 |
| $H_2S$ | 3.5 |
| $NH_3$ | 0.3 |
| CO | 5.7 |
| $CO_2$ | 6.8 |
| $N_2$ | 1.6 |
| | 100.0 |

About 5100 lbs./hour of this gas are obtained together with about 4600 lbs./hour of light oil and tar.

From the foregoing specification it may be seen that the invention provides a convenient, flexible and economic system for the pyrolysis of hydrocarbons and in particular for generating hot gases to be used in a pyrolysis process.

By reheating the solids removed at the close of the first heating stage to a rather high temperature and then using them to generate high temperature gas for the second heating stage prior to their return to the first heating stage, applicants are able to minimize the quantity of high temperature heat required for the system and to avoid the necessity of constructing a separate solids system purely for the purpose of generating hot second stage gas. Contamination of the product gas by difficultly separable impurities is avoided.

What is claimed is:

1. In a process for the pyrolysis of normally solid and liquid hydrocarbonaceous materials wherein such hydrocarbonaceous material is mixed with a first hot stream of gases and entrained solids in a first heating stage to form a combined stream and to heat and at least partially volatilize said material, solids are separated from the combined stream, and the gaseous materials remaining after separation of solids are mixed in a second heating stage with a second stream of hot gas to pyrolyze said remaining materials, the improvement which comprises reheating the solids separated from said combined stream, then contacting at least a portion of the reheated solids with a cool gas, thereby heating said cool gas, and mixing the cool gas so heated, in the second heating stage, as the second stream of hot gas.

2. The method claimed in claim 1 wherein the cool gas is heated by countercurrent contact with the reheated solids.

3. In a process for the pyrolysis of liquid and solid hydrocarbonaceous materials wherein hydrocarbonaceous material is mixed with a first hot stream of gases and entrained solids in a first heating stage to form a combined stream and to heat and at least partially volatilize said material, solids are separated from the combined stream and the gaseous material remaining after separation of solids is mixed in a second heating stage with a second stream of hot gas to pyrolyze at least a part of said remaining material, the improvement which comprises contacting the solids separated from said combined stream with a third stream of hot gases and thereby reheating said solids, contacting the reheated solids with cool gas, thereby heating said cool gas and mixing the cool gas so heated in the second heating stage as the second stream of hot gas.

4. The process claimed in claim 3 wherein the solids separated from the combined stream are contacted countercurrently with the third stream of hot gases to reheat said solids.

5. The process claimed in claim 3 wherein the third stream of hot gases is generated by burning a portion of the solids separated from said combined stream.

6. The process claimed in claim 5 in which the portion of the solids burned is burned in contact with the portion of the solids remaining unburned.

7. The process claimed in claim 5 wherein the portion of the solids burned is burned apart from the portion remaining unburned.

8. The process claimed in claim 3 wherein the third stream of hot gases is generated by burning a fluid fuel.

9. The process claimed in claim 8 wherein the fluid fuel is burned in contact with the separated solids.

10. The process claimed in claim 8 wherein the fluid fuel is burned apart from the separated solids.

11. The process claimed in claim 3 wherein the hydrocarbonaceous material is a residual fuel oil.

12. A process for the pyrolysis of normally solid and liquid hydrocarbonaceous material which comprises mixing hydrocarbonaceous material with a first hot stream of gases and entrained solids in a first heating stage to form a combined stream and to heat and at least partially pyrolyze said material to between about 900° F. and about 1900° F., separating solids from said combined stream, mixing the gaseous materials remaining in said combined stream after separation of solids therefrom in a second heating stage with a second stream of hot gas to raise the temperature of said remaining material to between about 1300° F. and about 2500° F. to pyrolyze at least apart of said remaining material, reheating the solids separated from said combined stream to between about 1500° F. and about 3200° F., contacting the reheated solids with a cool gas and thereby heating said cool gas to between about 1400° F. and about 3000° F. and mixing the cool gas so heated in said second heating stage as the second stream of hot gas.

13. A process for the manufacture of acetylene from normally solid and liquid hydrocarbonaceous materials which comprises mixing such material with a first hot stream of gases and entrained solids in a first heating stage to form a combined stream and to heat said material to between about 1400° F. and about 1900° F., separating solids from said combined stream, mixing the gaseous materials remaining after separation of solids from said combined stream in a second heating stage with a second stream of hot gas to heat said remaining materials to between about 1800° F. and about 2500° F., and to pyrolyze at least a part of said remaining materials with the formation of acetylene, reheating the solids separated from said combined stream to between about 2300° F. and about 3200° F., contacting the reheated solids with a cool gas thereby heating said cool gas to between about 2200° F. and about 3000° F. and mixing the cool gas so heated in the second heating stage as the second stream of hot gas.

14. A process for the manufacture of butadiene from normally solid and liquid hydrocarbonaceous materials which comprises mixing such material with a first hot stream of gases and entrained solids in a first heating stage to form a combined stream and to heat said material to between about 900° F. and about 1400° F., separating solids from the combined stream, mixing the gaseous materials remaining after separation of solids from said combined stream in a second heating stage with a second stream of hot gas to heat said remaining materials to between about 1300° F. and about 1800° F., and to pyrolyze at least a part of said remaining materials with the formation of butadiene, reheating the solids separated from said combined stream to between about 1500° F. and about 2100° F., contacting the reheated solids with a cool gas and thereby heating said cool gas to between about 1400° F. and about 2000° F. and mixing the cool gas so heated in said second heating stage as said second stream of hot gas.

References Cited in the file of this patent
UNITED STATES PATENTS

| | | |
|---|---|---|
| 2,572,664 | Robinson | Oct. 23, 1951 |
| 2,823,243 | Robinson | Feb. 11, 1958 |